(12) United States Patent
Chen et al.

(10) Patent No.: US 6,801,408 B1
(45) Date of Patent: Oct. 5, 2004

(54) DATA STORAGE AND RETRIEVAL APPARATUS WITH THIN FILM READ HEAD HAVING A PLANAR SENSOR ELEMENT AND AN EXTRA GAP AND METHOD OF FABRICATION THEREOF

(75) Inventors: Yingjian Chen, Fremont, CA (US); Ronald A. Barr, Mountain View, CA (US); Hau-Ching Tong, San Jose, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 400 days.

(21) Appl. No.: 09/705,420

(22) Filed: Nov. 2, 2000

(51) Int. Cl.[7] .................................................. G11B 5/39
(52) U.S. Cl. ....................................... 360/319; 360/320
(58) Field of Search .................................. 360/319, 320

(56) References Cited

U.S. PATENT DOCUMENTS

| | | |
|---|---|---|
| 4,636,897 A | 1/1987 | Nakamura et al. |
| 4,666,554 A | 5/1987 | De Wilde et al. |
| 4,742,412 A | 5/1988 | Kuriyama |
| 4,771,349 A | 9/1988 | Tsang |
| 4,807,073 A | 2/1989 | Takeura et al. |
| 4,881,143 A | 11/1989 | Bhattacharyya et al. |
| 4,947,541 A | 8/1990 | Toyoda et al. |
| 4,971,896 A | 11/1990 | Kawabe et al. |
| 5,018,037 A | 5/1991 | Krounbi et al. |
| 5,079,035 A | 1/1992 | Krounbi et al. |
| 5,111,352 A | 5/1992 | Das et al. |
| 5,206,590 A | 4/1993 | Dieny et al. |
| 5,208,715 A | 5/1993 | Mowry |
| 5,212,609 A | 5/1993 | Yuito et al. |
| 5,212,611 A | 5/1993 | Dee |
| 5,264,980 A | 11/1993 | Mowry et al. |
| 5,274,520 A | 12/1993 | Matsuzono et al. |
| 5,274,521 A | 12/1993 | Miyauchi et al. |
| 5,331,493 A | 7/1994 | Schwarz |
| 5,349,745 A | 9/1994 | Kawabe et al. |
| 5,363,265 A | 11/1994 | Hsie et al. |
| 5,434,826 A | 7/1995 | Ravipati et al. |
| 5,462,637 A | 10/1995 | Thiele |
| 5,492,720 A | 2/1996 | Gill et al. |
| 5,508,866 A | 4/1996 | Gill et al. |
| 5,527,726 A | 6/1996 | Possin et al. |

(List continued on next page.)

FOREIGN PATENT DOCUMENTS

JP        10-228610        * 8/1998

Primary Examiner—David Ometz
(74) Attorney, Agent, or Firm—Haynes Beffel & Wolfeld LLP (57) ABSTRACT

In at least one embodiment, the apparatus of the invention is a read sensor which includes a shield, a sensor element, a read gap positioned between the shield and the sensor element, and an extra gap positioned between the shield and the sensor element and adjacent the read gap. The sensor element is positioned in a sensor layer. With the sensor element and the shield separated by only the relatively thin gap layer, high sensitivity of the sensor element is obtained. Further, by placing the relatively thick extra gap between the shield and the sensor layer and about the sensor element, the potential for shorting is minimized. The shield can be planarized to keep the read gap and the sensor layer at, and about, the sensor element substantially planar. This, in turn, results in improved control of sensor track widths and greatly reduces the potential for pooling of photoresist. In at least one embodiment, the method of the invention is for fabricating a read sensor and includes depositing a read gap onto a planarized shield, depositing an extra gap adjacent an exposed portion of the read gap, and depositing a sensor element onto the exposed portion of the first gap and adjacent to the extra gap.

17 Claims, 5 Drawing Sheets

U.S. PATENT DOCUMENTS

| | | |
|---|---|---|
| 5,546,254 A | 8/1996 | Gill |
| 5,563,752 A | 10/1996 | Komuro et al. |
| 5,568,335 A | 10/1996 | Fontana et al. |
| 5,608,593 A | 3/1997 | Kim et al. |
| 5,633,771 A | 5/1997 | Yoda et al. |
| 5,637,235 A | 6/1997 | Kim et al. |
| 5,644,455 A | 7/1997 | Schultz |
| 5,646,805 A | 7/1997 | Shen et al. |
| 5,652,687 A | 7/1997 | Chen et al. |
| 5,653,013 A | 8/1997 | Gill et al. |
| 5,664,316 A | 9/1997 | Chen et al. |
| 5,669,133 A | 9/1997 | George |
| 5,700,380 A | 12/1997 | Krounbi et al. |
| 5,707,538 A | 1/1998 | Shen et al. |
| 5,721,008 A | 2/1998 | Huang et al. |
| 5,729,410 A | 3/1998 | Fontana, Jr. et al. |
| 5,734,533 A | 3/1998 | Nepela |
| 5,739,988 A | 4/1998 | Gill |
| 5,739,990 A | 4/1998 | Ravipati et al. |
| 5,742,459 A | 4/1998 | Shen et al. |
| 5,748,416 A | 5/1998 | Tobise et al. |
| 5,754,376 A | 5/1998 | Kobayashi et al. |
| 5,764,447 A | 6/1998 | Lazzari |
| 5,764,448 A | 6/1998 | Lazzari et al. |
| 5,774,308 A | 6/1998 | Ohtsuka et al. |
| 5,777,542 A | 7/1998 | Ohsawa et al. |
| 5,779,923 A | 7/1998 | Krounbi et al. |
| 5,805,389 A | 9/1998 | Saito et al. |
| 5,828,530 A | 10/1998 | Gill et al. |
| 5,889,640 A | 3/1999 | Hayashi et al. |
| 5,898,547 A | 4/1999 | Fontana, Jr. et al. |
| 5,898,548 A | 4/1999 | Dill et al. |
| 5,898,549 A | 4/1999 | Gill |
| 5,978,182 A | 11/1999 | Kanai et al. |
| 6,342,993 B1 * | 1/2002 | Sato .................. 360/319 |
| 6,496,334 B1 * | 12/2002 | Pang et al. .......... 360/319 |
| 6,525,913 B1 * | 2/2003 | Mauri et al. ........ 360/320 |
| 6,563,678 B2 * | 5/2003 | Sato .................. 360/320 |
| 6,614,629 B1 * | 9/2003 | Kakihara ............ 360/324.1 |

* cited by examiner

DATA STORAGE AND RETRIEVAL APPARATUS WITH THIN FILM READ HEAD HAVING A PLANAR SENSOR ELEMENT AND AN EXTRA GAP AND METHOD OF FABRICATION THEREOF

BACKGROUND

Typical thin film read heads are located between shields. The shields improve head performance by shielding stray magnetic flux from the sensor element. Gap layers electrically insulate the shields from the sensor element and from abutting lead structures.

As read head structures become smaller to improve areal density, it is desirable to reduce the thickness of the insulative gap layers to optimize head sensitivity. Although reducing the thickness of the gap layers improves sensitivity by reducing the distance between the sensor and the shield, it also allows lead structures, deposited lateral to the sensor element, to more easily short to the shields. Such shorting can be due to flaws in, or degradation of, the gap material, or by defects created during the fabrication process. For example, a pinhole in the gap material can allow current to flow from a lead element to the shield.

Because shield-to-shield spacing is not as critical away from the sensor element, it is not necessary to have a thin gap in the areas away from the sensor element. As such, to reduce shorting, extra gap layers typically are deposited over the gap layers, at areas apart from the location of the sensor element. This increases the gap thicknesses in the regions about the sensor element, and as such, reduces the occurrence of shorting between the lead structures and the shields.

Figure 1:
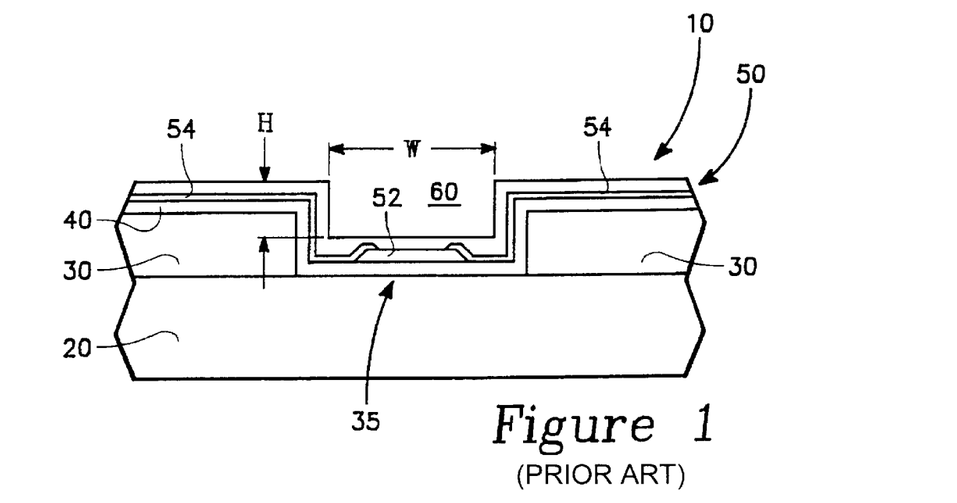
FIG. 1 is a view from the air bearing surface of a partially fabricated read head device.

An example of such a structure is shown in FIG. 1. In this device the read head 10 has a shield 20 with extra gap layers 30 placed over the shield 20 and about a void 35. Placed over the extra gap layers 30 and the shield 20 is a first gap layer 40. Then, above the first gap 40 is a sensor layer 50, which includes leads 54. A cavity 60 is defined by the deformed shape of the sensor layer 50, caused by the void 35. Although the use of the extra gap layer 30 reduces shorting between the leads 54 and the shield 20, the present inventors have found such structures difficult to reliably manufacture with submicron track widths. Sub-micron track widths are necessary for high track density applications greater than about 15 Kilo tracks per inch and areal densities greater than about 7 Giga bits per square inch.

Because of the uneven surface created by laying the first gap layer 40 and sensor layer 50 over the void 35, and the relatively small width W of the cavity 60, variations in the track widths of the sensor element 52 of the sensor layer 50 tend to occur. These track width variations are due to the inherent variations in the width W and depth H of the cavity 60 and the effect the dip of the cavity 60 has on controlling the flow of the photoresist (which tends to pool in the cavity), used to etch the sensor layer 50 and define the track width of the sensor element. In addition, as the thickness of the photoresist is reduced to provide small structures, it is very difficult to adjust the thickness within the cavity 60.

Typically, photoresist thickness is controlled by spinning the workpiece to reduce the thickness of the photoresist. As the cavity 60 width and photoresist thickness is reduced, however, the surface tension of the photoresist causes a pool to form within the cavity 60. The pooling makes the photoresist resistive to change in its thickness. As such, it is very difficult to control photoresist uniformity across the workpiece and to control the thickness of any small photoresist structure formed within the cavity 60.

Because the track width of the sensor is directly related to the thickness of the photoresist used to define the sensor, the lack of photoresist uniformity causes a similar problem in controlling track widths. The resulting high variation in sensor track widths causes a significant number of devices to have track widths outside the manufacturing tolerances. Thus, the lack of photoresist uniformity caused by deposition over the cavity 60 results in a high rate of loss of devices during manufacture.

An another example of a sensor with increased gap thicknesses away from the sensor is the sensor disclosed in U.S. Pat. No. 5,568,335, by Fontana, et al., issued Oct. 22, 1996, entitled MULTI-LAYER GAP STRUCTURE FOR HIGH RESOLUTION MAGNETORESISTIVE READ HEAD, herein incorporated by reference in its entirety. In this device, the extra gap layer is deposited over the gap layer lateral to and away from the sensor element. It has been found that this type of structure is also difficult to reliably manufacture with submicron track widths. Therefore, such structures, while improving reliability of the read heads, prove to be an impediment to obtaining high areal density.

One approach to solve the problems associated with the use of extra gap material, involves etching the shield on either side of the sensor location to receive the deposition of the extra gap layer. This approach is advantageous as it avoids a deformed sensor layer by providing a relatively flat and smooth surface for the application of the sensor layer. An example of this approach is disclosed in U.S. patent application Ser No. 09/325,104 by Knapp, et al., Filed: Jun. 3, 1999, entitled DATA STORAGE AND RETRIEVAL APPARATUS WITH THIN FILM READ HEAD INSET EXTRA GAP INSULATION LAYER AND METHOD OF FABRICATION, herein incorporated by reference in its entirety. Although this approach significantly reduces the variations in track widths associated with the prior methods, some measure of sensor to shield shorting still may still occur. This shorting is typically due to the fencing of material at the edges of the extra gap layer. This fencing can cause shorts by providing connections between the shield and the sensor leads.

Therefore, a need exists for a narrow gap read sensor and method of fabrication thereof, which provides sufficiently small read track widths, with a minimum of width variation over a series of such sensors, and which sensor to shield shorting is significantly reduced or effectively eliminated.

SUMMARY

The present invention provides a thin film read head, having a planar sensor element and an extra gap layer, and a method of fabrication thereof. The apparatus of the invention is a read sensor which includes a shield, a planar sensor element, a read gap positioned between the shield and the sensor element, and an extra gap positioned between the shield and the sensor element, and positioned adjacent the read gap. The sensor element is positioned in a sensor layer. With the sensor element and the shield separated by only the relatively thin gap layer, high sensitivity of the sensor element is obtained. Further, by placing the relatively thick extra gap between the shield and the sensor layer, and about the sensor element, the potential for shorting between the shield and the sensor layer is minimized. The shield can be planarized to provide a substantially planar read gap and sensor layer at, and about, the sensor element. This, in turn, results in improved control of sensor track widths by greatly reducing the potential for pooling of photoresist during fabrication of the read sensor.

By having the portion of the sensor layer containing the sensor element substantially planar, track width manufacturing variations are minimized. This is because the present invention eliminates the need to deform the sensor layer, as occurred in the prior art when the sensor layer had to be deposited over a cavity. That is, track width variations are reduced by positioning the sensor layer upon a substantially planar read gap layer. The read gap layer can be made substantially planar by laying it on a planarized upper surface of the shield.

The read gap is sufficiently wide to fully separate the sensor element from the shield. The read gap has edges on each of its sides. The extra gap is positioned generally adjacent to the read gap and the sensor element, and extends laterally therefrom. Preferably, the extra gap overlaps the edges of the read gap to assure electrical insulation between the sensor layer and the shield. In this manner, the sensitivity of the sensor element is maximized by placing only the relatively thin gap layer between the sensor element and the shield. At the same time, the potential for shorting between the sensor layer and the shield is minimized by placing the thicker extra gap between the sensor lead elements and the shield. The increased sensitivity of the present invention allows for use of media with areal density in the range of about 100 Gb/in$^2$.

Preferably the extra gap and the read gap are alumina ($Al_2O_3$) and the shield is nickel iron (NiFe). Preferably, the read gap layer is between 200 Å and 400 Å thick.

In at least one embodiment, the invention includes a data storage and retrieval apparatus which includes a magnetic recording media, a head assembly located adjacent to the magnetic recording media, and a motor coupled to the media so as to move the media with respect to the head assembly. The head assembly in turn includes a write head and a read head. The read head includes a shield, a planar sensor element, a read gap positioned between the shield and the sensor element, and an extra gap positioned between the shield and the sensor element, and adjacent the read gap.

The method of the invention is for fabricating a read sensor and includes depositing a read gap onto a planarized shield, depositing an extra gap adjacent an exposed portion of the read gap, and depositing a sensor element onto the exposed portion of the read gap and adjacent the extra gap. The method can also include planarizing the upper surface of the shield to assure that the read gap, and thus the sensor element, are substantially planar. A chemical mechanical polish (CMP) is preferably used to planarize the shield. It is preferred that after depositing the read gap layer, portions of the read gap layer and shield are removed to define a read gap center portion having edges. Preferably, either ion milling or a reactive ion beam etch (RIBE) is used to remove these portions of the read gap and shield. The extra gap is then deposited over the exposed portions of the shield and preferably overlaying the edges of the read gap element.

In at least one embodiment of the method, the steps include planarizing a shield by chemical mechanical polishing, depositing a read gap layer onto the shield, removing portions of the read gap layer and portions of the shield about a read gap center element having sides (so that the shield has an exposed surface defined by the removed portion of the shield), depositing an extra gap adjacent to and contacting the read gap center element (where the extra gap is deposited over the exposed portion of the shield and over the sides of the read gap center element), depositing a sensor layer over the read gap center element and over the extra gap, and fabricating a read sensor within the sensor layer.

DETAILED DESCRIPTION OF THE PREFERRED EMBODIMENTS OF THE INVENTION

The present invention is embodied in an apparatus and method of fabrication which provide several advantages over the prior art.

One advantage is that by employing a thin insulative layer between the sensor layer and the shield, only at the location of the sensor element, the apparatus provides improved sensitivity of the sensor element while reducing or eliminating the possibility of shorting between the sensor layer (leads) and the shield. Because the distance between the sensor element and the shield is reduced, the sensor element can read (sense) reduced sized data bits. Smaller data bits in turn provide increased areal density of the media, in the range of 100 Gb/in$^2$ for the present invention. The increased areal density allows greater storage capacities to be achieved in the same sized, or smaller, hard drives.

Another advantage of the present invention is that the possibility of shorting is reduced or eliminated. This is because the apparatus has, located about the sensor element, a thick insulative layer of material separating the sensor layer from the shield. Specifically, the leads of the sensor layer are separated from the shield by an extra gap layer. This thick insulating layer prevents or greatly limits shorting due to degradation of the gap material or defects created during the fabrication process.

Another advantage of the present invention is that a sufficient increase in production yield is achieved by reducing variations in the track width of the sensor element. That is, a lower standard deviation (sigma) from the mean sensor width is obtained. This lower sigma value results in a reduction of the number of sensors manufactured with track widths outside the allowable manufacturing tolerances. This sigma reduction is obtained by configuring the elements of the read sensor so that the portion of the sensor layer at and about the sensor element is applied to a substantially flat surface. By doing so, the present invention eliminates the need to deform the sensor layer, as was the case in the prior art, where the sensor layer was deposited over a cavity. As such, the track of the present invention is not subject to variations in the width and/or depth of some cavity. Further, with the sensor layer laying substantially flat, the problem of photoresist pooling is greatly reduced or eliminated.

Still another advantage of the present invention is the avoidance of shorting due to fencing. Fencing has occurred with some prior art devices which use photoresist when etching or milling regions of the shield of the read sensor. In certain circumstances the shield material ejected during milling collects along the sides of the photoresist. When the photoresist is removed, the collected ejected material forms fences or spikes shapes. These fences can extend far enough up from the shield to pass through the gap layer and contact the sensor layer. Of course, with a fence connecting the shield and sensor layer, a short will exist and the performance of the sensor is considerably degraded.

In contrast, in the present invention, even if some fencing or spiking does exist, it will not cause shorting between the sensor and the shield. This is in part due to the fact that during manufacturing, the shield is planarized and then covered by the read gap layer. The planarization of the shield removes any uneven or protruding elements in the surface of the shield. By providing a smooth surface for the deposition of the read gap material, the quality of the read gap is optimized. In addition, shorting between the sensor and shield is further prevented by the deposition of the relatively thick extra gap layer. Since the extra gap layer is deposited over and about the areas where the shield is milled, redeposited material (if any) cannot reach from the shield to the sensor layer and cause a short.

One more advantage of the present invention is that the milled surfaces of the shield layer are sufficiently rough to provide improved adhesion between the shield and the extra gap layer. This reduces or eliminates the problem of delamination of the extra gap layer. As such, the production yield of the present invention is further improved.

Preferred Embodiments of the Apparatus of the Invention:

In at least one embodiment, the apparatus of the present invention is a read sensor 100 which includes a shield 110, a read gap 120, an extra gap 130, and a sensor layer 140. These elements are shown in FIG. 2.

The shield 110 operates to shield the read sensor from any stray magnetic flux. The shield 110 is preferably a plated nickel iron (NiFe), however, the shield can be any other of a variety of known materials which provide sufficient shielding to the sensor. The shield 110 is formed to a thickness to provide sufficient shielding to the sensor, even after the shield 110 has been planarized. The shield 110 includes an upper surface 112. Preferably, the upper surface 112 has been planarized such that it provides a relatively flat surface for the read gap layer 120. The shield 110 also has milled surfaces 114 which extend generally downward and away from the upper surface 112. It is preferred that the surfaces 114 are relatively rough so as to provide improved adhesion to the extra gap 130 to the shield 110. The improved adhesion acts to eliminate or greatly reduce the occurrence of delamination of the extra gap 130 from the shield 110. Which in turn improves wafer yields by lowering the rate of loss of devices during manufacture.

Figure 2:
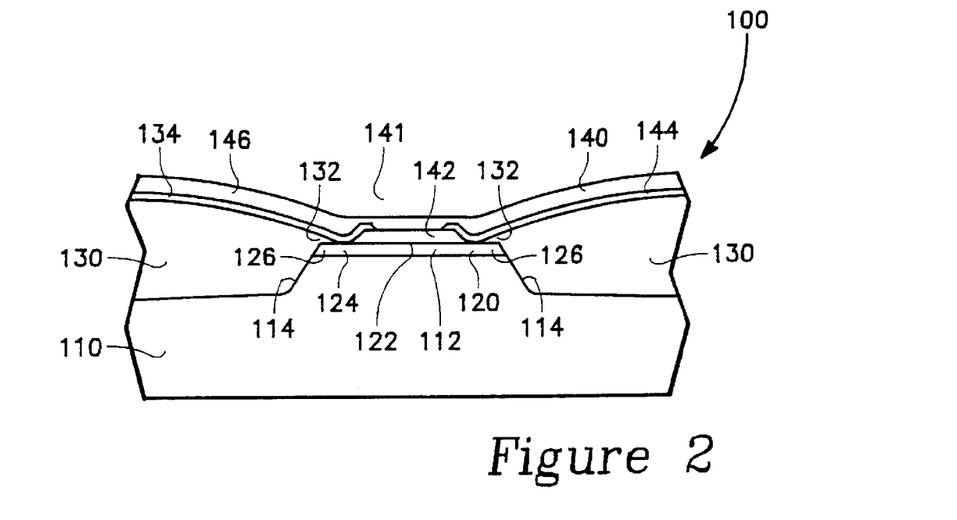
FIG. 2 is a view from the air bearing surface of a partially fabricated read head in accordance with an embodiment of the present invention.

The read gap layer 120 is positioned across the upper surface 112, as shown in FIG. 2. The read gap layer 120 has a planar upper surface 122. The read gap layer 120 functions to optimize head sensitivity by providing an electrically insulative barrier, of a minimal thickness, set between a sensor element 142 (defined in the sensor layer 140) and the shield 110. The read gap 120 can be a dielectric material. Specifically, the read gap 120 can be any of a variety of insulative materials, including, alumina ($Al_2O_3$), silicon oxide ($SiO_2$), diamond-like carbon, tantalum oxide ($Ta_2O_5$), titanium oxide and magnesium oxide. The preferred material for the read gap 120 is alumina ($Al_2O_3$). The thickness of the read gap 120 should be thin enough to allow resolution of the spacial variation of the signal from the passing media. The read gap 120 can be any substantially uniform thickness which provides sufficient insulation while achieving the desire head sensitivity, namely in the range of 200 Å to 500 Å thick. But, it is preferred that the thickness of the read gap 120 be between 200 Å to 400 Å. The read gap layer 120 includes the read gap center element 124 and edges 126. As shown in FIG. 2, the edges 126 are overlaid by the extra gap 130.

As can be seen in FIG. 2, the extra gap 130 is positioned in two portions over the shield 110 and preferably overlying the edges 126 of the read gap layer 120. The portions of the extra gap 130 are positioned on either side of the read gap layer 120. The extra gap 130 functions to electrically insulate the shield 110 from the sensor layer 140 and from abutting lead structures. The extra gap 130 preferably has a thickness of between 1400 Å and 1700 Å. However, the extra gap 130 can be thicker or thinner so long as it is sufficiently thick to prevent, or greatly limit, shorting between the shield 110 and the sensor layer 140. Such shorting can be caused by flaws (such as pinholes) in, or the degradation of, the gap material. The extra gap 130 can be any of a variety of insulative materials, including, alumina ($Al_2O_3$), silicon oxide ($SiO_2$), diamond-like carbon, tantalum oxide ($Ta_2O_5$), titanium oxide and magnesium oxide. Preferably, the extra gap 130 is an alumina ($Al_2O_3$). The extra gap layers 130 include inboard areas 132 which are each located adjacent to and over the edges 126 of the read gap 120. The extra gap layers 130 also include upper surfaces 134.

The sensor layer 140 is positioned generally flat over both the read gap 120 and the extra gap 130. The sensor layer 140 includes a sensor element 142 and leads 144. The sensor element 142 can be any of a variety of sensors, including magnetoresistive (MR), giant magnetoresistive (GMR), spin-dependent tunneling (SDT), current-in-plane (CIP), current perpendicular to the plane (CPP), or the like. Further, the sensor element 142 can be of any of a variety of configurations, for example, a top spin value, bottom spin value, or the like. For illustrative purposes the sensor element 142 is shown in FIG. 2 as a CIP type of device.

By having a portion 141 of the sensor layer 140, about the location of the sensor element 142, being substantially planar, the sensor layer 140 avoids placing the sensor element 142 into a cavity shape (as was the case in the prior art—as shown in FIG. 1). The flatness of the portion 141 of the sensor layer 140 eliminates variations of width and depth associated with a cavity, and thus avoids variations in the track width of the sensor element 142. Also, the flatness of the sensor layer 140 allows increased control of the thickness of the photoresist layer. This is because the present invention avoids the problem of variable thickness of the photoresist caused by pooling of the photoresist in cavities containing the sensor element. Since the thickness of the photoresist directly affects the width of the sensor element 142, created during etching of the sensor layer 140, reductions in variations of the thickness of the photoresist result in reductions in variations in the width of the sensor element 142.

Figure 4:
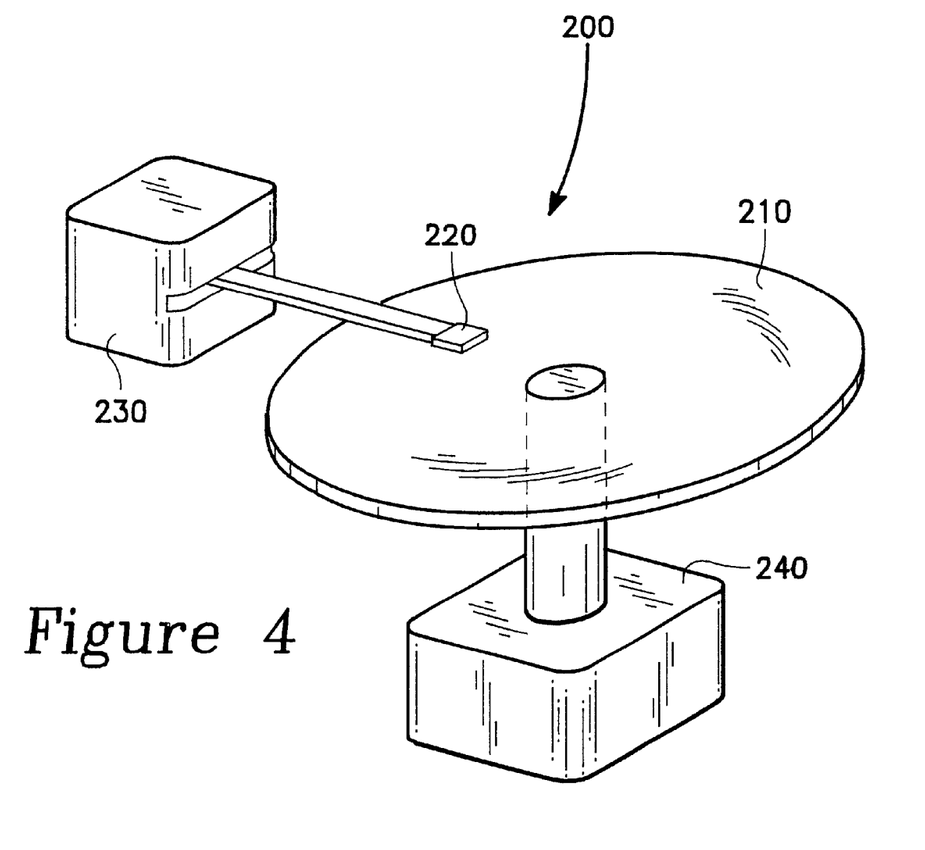
FIG. 4 is a is an isometric view of a data storage and retrieval apparatus in accordance with the present invention.

FIG. 4 shows the read sensor of the present invention embodied in a disk type magnetic data storage and retrieval apparatus 200. The write head of the present invention is located within a merged head assembly 220 which rides above a magnetic storage media 210, depicted in FIG. 4 as a rotatable hard disk type storage media. The hard disk 210 is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220.

Preferred Embodiments of the Method of the Invention:

In at least one embodiment, the method 400 of the present invention includes the steps of depositing a shield 410, planarizing the shield to form a planarized surface 420, depositing a read gap layer onto the planarized surface 430, applying a photoresist onto the read gap 440, removing portions of the read gap and shield about the photoresist 450, depositing an extra gap layer contacting the read gap and onto the shield 460, removing the photoresist 470, depositing a sensor layer over the read gap and extra gap layers 480, forming a read sensor and leads in the sensor layer 490. This embodiment of the method is shown in FIGS. 2, 3a–h and 5.

Figure 3A:
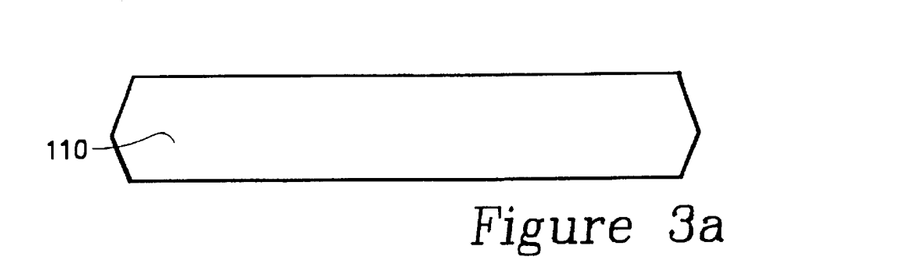
FIGS. 3a–h are views from the air bearing surface showing steps of a method of fabrication in accordance with an embodiment of the present invention.
Figure 5:
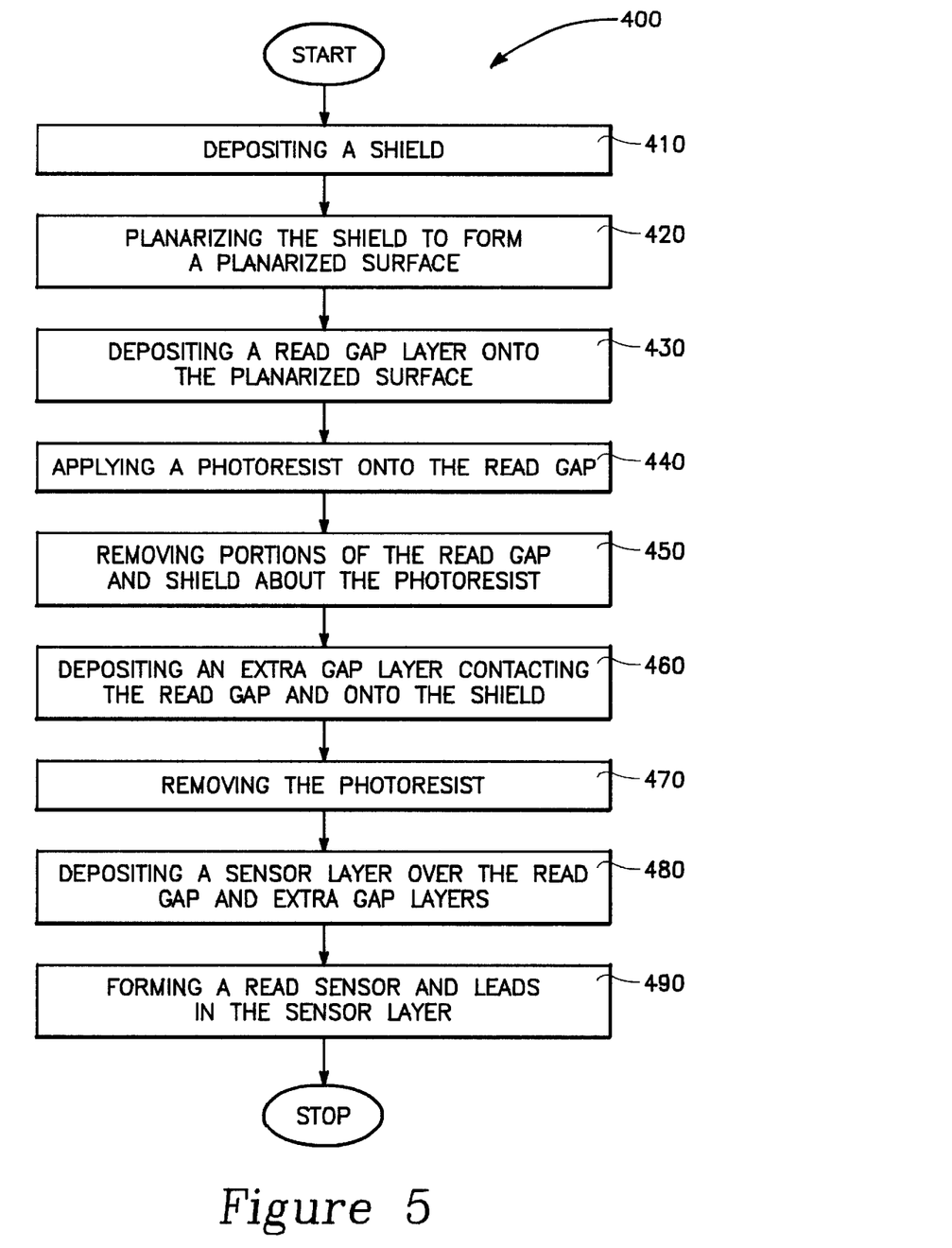
FIG. 5 is a flow chart of a method of fabrication in accordance with an embodiment of the present invention.

The step of depositing a shield 410 is shown in FIGS. 3a and 5. During this step a bottom shield, first shield or shield 110 is deposited preferably by any well known electroplating method. The shield 110 being preferably a plated nickel iron (NiFe).

Figure 3B:
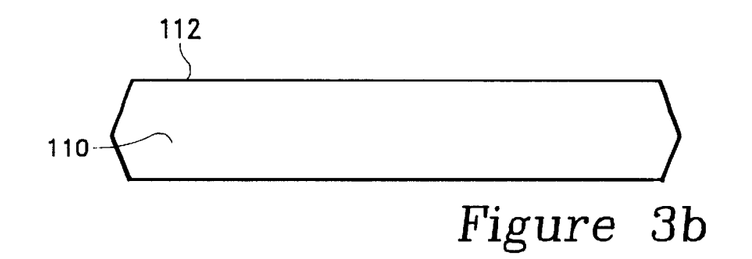

The next step is planarizing the shield to form a planarized surface 420, as shown in FIGS. 3b and 5. During this step an upper portion of the shield is removed to provide a substantially flat planarized surface. In so doing the thicknesses of shield 110 is reduced. The planarization of the of the shield 110 can be performed by any of a variety of well known methods, however it is preferred that a chemical mechanical polish (CMP) is used. Planarizing the shield 110 defines an upper surface 112. It is preferred that the upper surface 112 has an average roughness of 8 Å after the shield 110 has been planarized by the CMP process. Of course, if the shield is sufficiently smooth and planar after its deposition, the CMP step will not be needed.

Figure 3C:
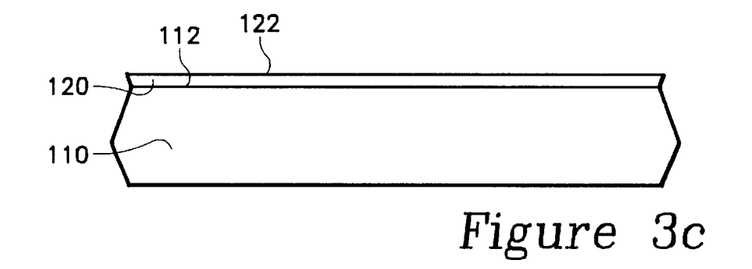

Next, the step of depositing a read gap layer onto the planarized surface 430 is performed. This step is shown in FIGS. 3c and 5. During this step, the read gap 120 is deposited over the shield 110. Because the upper surface 112 is planarized, the read gap 120 lies flat and has a flat upper surface 122. The read gap 120 is deposited to enough of a thickness to provide sufficient insulation against shorting between the shield 110 and the later applied sensor layer 140. However, the thickness of the read gap 120 is limited to allow the desired head sensitivity to be achieved. The preferred range of thicknesses of the read gap is between 200 Å–400 Å thick. The read gap 120 can be deposited by any of a variety of known methods, including, spinning on the material, ion beam deposition (IBD), chemical vapor deposition (CVD) and sputter deposition. The sputter deposition can be reactive or non-reactive, RF diode or DC magnetron sputtering.

Figure 3D:
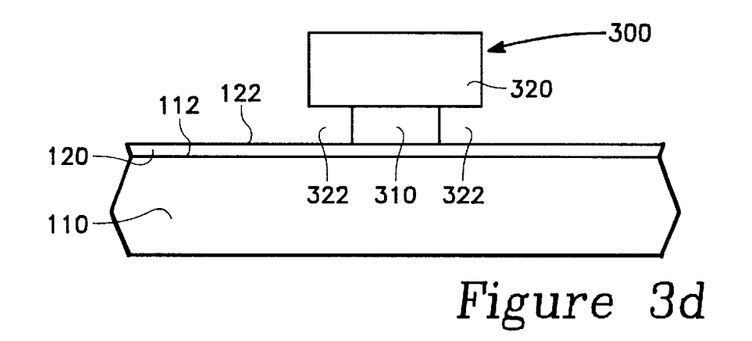

Then, the next step is applying a photoresist onto the read gap 440. This step is shown in FIGS. 3d and 5. During this step a photoresist 300 is deposited over the read gap 120. The photoresist 300 can be applied by any of a variety of well known methods. Further, any of a variety of resist structures and lithographic techniques well known in the art can be used during this step, including, a single layer resist, a bi-layer resist, a negative resist, a trilayer resist, silated, or others. However, it is preferred that a bi-layer photoresist is used. A specific example of a usable photoresist is PMGI manufactured by Shipley of Massachusetts. This step can include the sub-steps of applying the photoresist by spinning it onto the surface of the wafer, then applying a mask over the photoresist and exposing the photoresist, to harden the portion of the photoresist located over the desired location of the later defined sensor element 142 (not shown in FIG. 3d). Then, a developer or other known solvent, is applied to remove the unhardened portions of the photoresist 300. The bi-layer photoresist 300, includes a relatively soft (quicker to dissolve) base layer 310 and a harder (slower to dissolve) top layer 320. The base layer 310 is spun on first and then the top layer 320 is spun onto the base layer 310. When the unhardened portion of the photoresist is removed, some of the base layer is also dissolved to create overhangs 322 on each side of the photoresist 300.

Figure 3E:
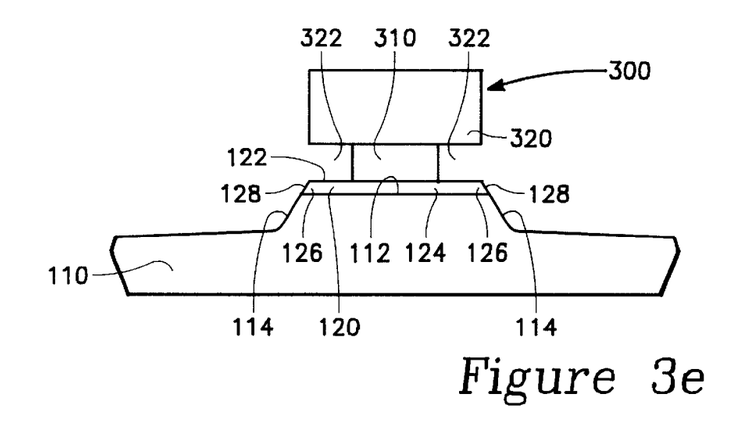

The next step of the method 400 is removing portions of the read gap and shield about the photoresist 450. This step is shown in FIGS. 3e and 5. During this step any milling or etching method well known in the art can be used to remove portions of the read gap layer 120 and shield 110 about the photoresist 300. Either ion milling, reactive ion etching (RIE), reactive ion beam etching (RIBE), or a combination thereof, can be used to remove the portions of both the read gap 120 and the shield 110. However, it is preferred that the portions of the read gap 120 are removed by a RIBE process and then the portions of the shield 110 are removed by an ion mill process. During the etching or milling, the partially constructed read sensor can be angled relative to the beam (e.g. from the vertical), such that the shadow created by the photoresist 300 causes angled surfaces 128 of the read gap layer 120 and angled surfaces 114 of the shield 110, to be created. Preferably, the etching or milling process will cause the surfaces 128 and surfaces 114 to be relatively rough. This roughness improves the adhesion of the surfaces with the later applied extra gap layer 130. The improve adhesion in turn reduces the occurrence of delamination of the extra gap layer 130, increasing the overall production or wafer yield. The amount of the shield 110 removed during this step can vary and depends upon the thickness of the extra gap 130 used and the allowable deformation of the sensor layer 140 (preferably the sensor layer is kept generally flat). With the preferred thickness range for the read gap (200 Å–400 Å) and of the extra gap 130 (1400 Å–1700 Å), the shield 130 is preferably milled or etched down between 800 Å and 1500 Å.

Figure 3F:
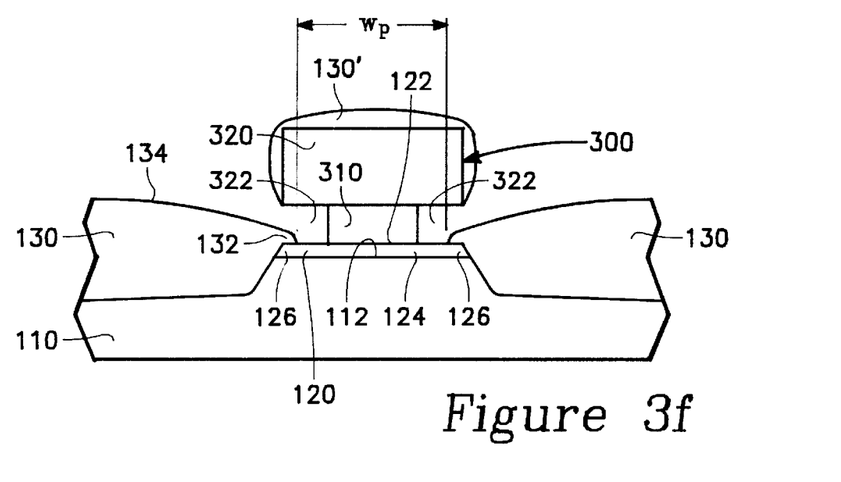

The next step is depositing an extra gap layer contacting the read gap and onto the shield 460. This step is shown in FIGS. 3f and 5. During this step, extra gap material is deposited across the partially constructed read sensor and over the photoresist 300. The areas where portions of the shield 110 were removed during the step of removing portions of the read gap and shield about the photoresist 450, are now filled by the extra gap material. Preferably, the adhesion of the extra gap layers 130 to the shield 110 and the read gap layer 120 is increased by the rough surfaces of the milled or etched surfaces 114 and 128. This increase adhesion reduces the potential for delamination of the extra gap layers 130. The extra gap material is also deposited over the edges 126 of the read gap 120. As such, the extra gap material is deposited on the removed portions of the shield 110 and over the edges 126 to form the extra gap layers 130 on either side of the read gap center element 124. As seen in FIG. 3f, the photoresist 300 is covered by extra gap material in an extra gap layer 130'.

The extra gap material can be deposited onto the partially constructed read sensor in any of a variety of methods well known in the art. These known methods include spinning on the material, ion beam deposition (IBD), chemical vapor deposition (CVD) and sputter deposition. Sputter deposition can be reactive or non-reactive, RF diode or DC magnetron sputtering. Preferably, the extra gap layer 130 is deposited to a thickness of between 1400 Å and 1700 Å. However, a lesser thickness is acceptable so long as the extra gap layer 130 is thick enough to substantially prevent shorting between the shield 110 and the later applied sensor layer 140 (not shown in FIG. 3f).

Because of the overhangs 322 on either side of the photoresist 300, the extra gap material can be deposited over the outer portions or edges 126 of the read gap 120. Specifically, the inboard areas 132, of the extra gap layers 130, overhang the edges 126 of the read gap 120, and are under the overhang 322 of the photoresist 300. The inherent spread of a sputter deposition will result in some of the extra gap material being deposited under the overhang 322 and onto the edges 126 of the read gap 120. With IBD deposition, it is preferred that the beam is at an angle relative to the normal (vertical of the read sensor), to allow extra gap material to be deposited under the overhang 322 and onto the edges 126 of the read gap 120. The amount which the extra gap 130 overhangs the read gap 120 can vary, but should be sufficient to maintain a continuous insulative barrier between the shield 110 and the later applied sensor layer 140 (not shown in FIG. 3*f*). The extra gap 130 should also cover the read gap center element 124 amply, such that the resulting continuous insulative barrier is thick enough to substantially prevent shorts occurring between the shield 110 and the later applied sensor layer 140 (not shown in FIG. 3*f*). Preferably, about $0.5\mu$ of the extra gap 130 should cover the edges 126 of the read gap 120.

The distance the extra gap 130 extends inward from the sides of the read gap 120 can vary, but it is preferred that enough of the upper surface 122 is left uncovered, or exposed, to allow the sensor element 142 (as shown in FIG. 2) to be deposited directly on the upper surface 122. It is further preferred that the uncovered portion of the upper surface 122 is sufficiently large to provide a planar surface at and about the location of the sensor element 142. The planar width, $w_p$, of the exposed upper surface (between the inboard ends of the extra gap layers 130) is a few microns in width. Preferably, however, the planar width, $w_p$, is greater than about 2.0 Å.

As shown in FIG. 2, having a planar region or portion 141 at and about the location of the sensor element 142, allows improved control over the read track width. As noted above, with the portion of the sensor layer 140 at and about the sensor element 142 applied to the planar upper surface 122, the area of the sensor layer 140 about and at the sensor element 142 is kept substantially flat. With the prior art, as shown in FIG. 1, the sensor layer 50 had to be deposited over a cavity. Inherent variations in the cavity width and depth caused variations in the read track width of the sensor 52 to occur. With the planar surface provided by the present invention, the track width of the sensor element 142 is no longer subject to variations in the width and/or depth of a cavity shape. Further, with the sensor layer 140 laying substantially flat, the photoresist used in defining the sensor element 142 is not susceptible to pooling, as occurs with the cavity of the prior art.

With reduced variations in the track width of the sensor element 142, a sufficient increase in the production yield of sensors can be achieved. The resulting lower standard deviation (sigma), from the mean sensor width, provides a reduction in the number of sensors manufactured with track widths outside the allowable tolerances.

It is also preferred that the slope and rise of the extra gap layers 130 as they extend away from the read gap layer 120 are kept low enough to provide a sufficiently planar surface for the deposition of the sensor layer 140. Preferably, the extra gap layers 130 will rise only about 200 Å over a distance of at least $2\mu$ outward (lateral) from the sensor element 142.

Figure 3G:
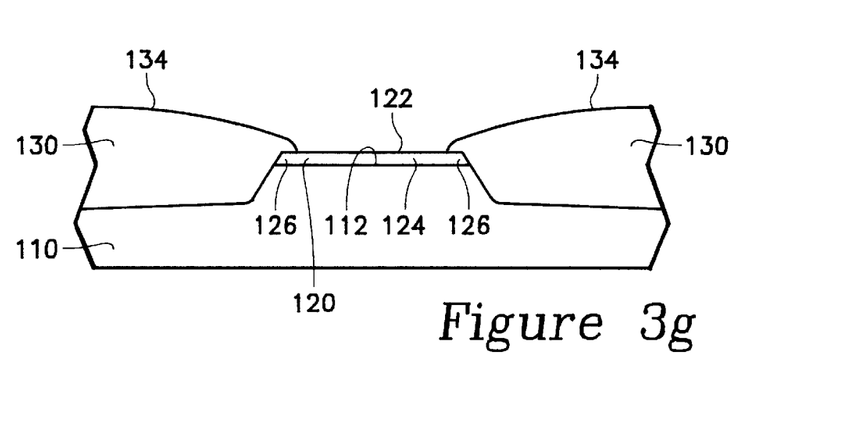

The next step in the method 400 is removing the photoresist 470. During this step the photoresist 300 is lifted-off the read sensor 100. The photoresist 300 can be removed by any well known method, including applying a developer to dissolve the photoresist. This step is shown in FIGS. 3*g* and 5.

Figure 3H:
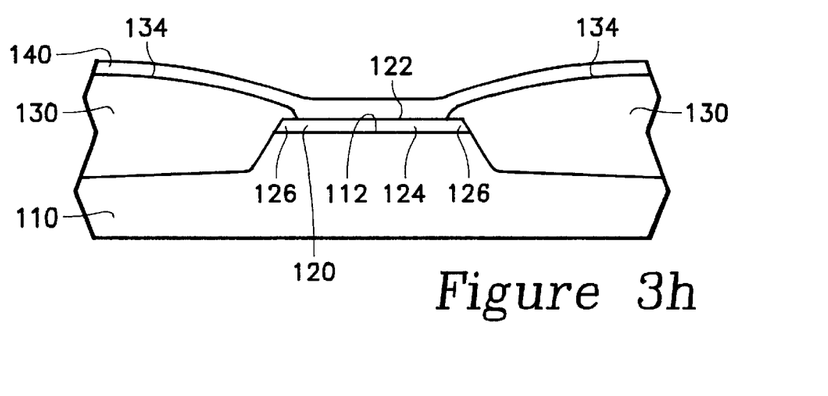

Then the step of depositing a sensor layer over the read gap and extra gap layers 480 is performed. This step is shown in FIGS. 3*h* and 5. During this step, the sensor layer 140 is deposited over the upper surface 122 of the read gap 120 and the upper surfaces 134 of both the extra gap layers 130. By being applied to the flat (planar) upper surface 122 of the read gap 120, sensor layer 140 is flat at the center portion 141. As such, the portion 141 does not have to conform to a cavity shape, as is the case with the prior art devices.

As noted above, the sensor layer 140 can be any of a variety of types. The specific material, layering and thickness of the sensor layer 140 is dependent upon the type of sensor element 142 which is to be defined from the sensor layer 140. For example, a CIP sensor layer can be layered (from the bottom) with a antiferromagnet (AFM) layer, a pinned layer, an intermediate layer, a sensing layer and lead layers and hard bias layers connected over and to the edges of the sensing layer.

The sensor layer 140 can be deposited by any of a variety of methods well known in the art, including ion beam deposition and/or sputtering.

The next step in the method 400 is forming a read sensor and leads in the sensor layer 490, as shown in FIGS. 2 and 5. This step includes photolithography and milling to define the sensor element 142 and lead deposition to apply the leads 144 to the sensor element 142. Photolithography, milling and lead deposition are well known in the art.

The photolithography process can involve any of a variety of well known resist structures and lithographic techniques well known in the art, including, a single layer resist, a bi-layer resist, a negative resist, a trilayer resist, silated, or others. It is preferred that the photolithography process involve applying a bi-layer photoresist over the desired area of the sensor element 142. One usable photoresist is PMGI manufactured by Shipley of Massachusetts. This step can include the sub-steps of applying the photoresist by spinning it onto the surface of the wafer, then applying a mask over the photoresist and exposing the photoresist to harden the portion of the photoresist located over the desired location of the sensor element 142. Then, a developer or other known solvent, is applied to remove the unhardened portions of the photoresist. This leaves overhangs on both sides of the bi-layer photoresist.

Next, the junction of the sensor 142 is defined by milling the sensor layer 140. The ion milling etches away the undesired portions of the sensor layer 140. That is, portions of the sensor layer 140, located outward from the bi-layer photoresist, are etched away. The ion beam is directed at an angle relative to the normal of the plane of the sensor layer 140 and the partially constructed read sensor is rotated relative to the ion beam. This produces sloping sides on the junction. The junction can also be defined by reactive ion beam etching (RIBE).

Then leads 144 are deposited over the sensor element 142 and out to either side. The deposited leads 144 are shown in FIG. 2. Typically, a hard bias layer (not shown) is deposited along with the leads 144. The leads 144 can be deposited by any well known method. Next, above the leads 144 and sensor element 142 is deposited an insulative layer 146 of any well known insulator, such as alumina ($Al_2O_3$). The deposition of the insulative layer 146 is well known in the art.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. A read sensor comprising:
   a) a shield;
   b) a planar sensor element;
   c) a read gap between the shield and the sensor element, the read gap comprising a layer having a center element and side edges; and
   d) an extra gap between the shield and the sensor element and adjacent the side edges of the read gap.

2. The read sensor of claim 1, wherein the sensor element is in a substantially planar portion of a sensor layer.

3. The read sensor of claim 2, wherein the read gap has a read gap upper surface, wherein the read gap upper surface is substantially flat.

4. The read sensor of claim 2, wherein the read gap has a read gap upper surface, wherein the read gap upper surface is substantially planar.

5. The read sensor of claim 4, wherein the shield has a shield upper surface, wherein at least a portion of the shield upper surface is positioned beneath the read gap, and wherein the portion of the shield upper surface positioned beneath the read gap is substantially planar.

6. The read sensor of claim 2, wherein the extra gap abuts the read gap to form a continuous separation between the shield and the sensor layer.

7. The read sensor of claim 6, wherein the read gap has sides, wherein the extra gap is positioned about the read gap, and wherein a portion of the extra gap overlays at least a portion of the edges of the read gap.

8. The read sensor of claim 7, wherein read gap is wider than the sensor element.

9. The read sensor of claim 8, wherein the shield comprises a plated nickel iron, and wherein the extra gap and the read gap comprise alumina.

10. The read sensor of claim 9, wherein the road gap is between 200 Å and about 400 Å.

11. The read sensor of claim 1 wherein the extra gap has a thickness at least about 1400 Å.

12. The read sensor of claim 1 wherein the extra gap has a thickness in a range about 1400 Å to about 1700 Å.

13. A data storage and retrieval apparatus comprising:
   a) a magnetic recording media;
   b) a head assembly positioned adjacent the magnetic recording media comprising:
      (i) a write head; and
      (ii) a write head comprising:
         (1) a shield;
         (2) a sensor element;
         (3) a read gap between the shield and the sensor element, the read gap comprising a layer having a center element and side edges; and
         (4) an extra gap between the shield and the sensor element and adjacent the side edges of the read gap;
   c) a motor coupled to the media so as to move the media with respect to the head assembly.

14. The data storage and retrieval apparatus of claim 13, wherein the sensor element is positioned within a substantially planar portion of a sensor layer, wherein the substantially planar portion of the sensor layer is positioned upon a substantially planar upper surface of the read gap, wherein the read gap is positioned upon a planarized upper surface of the shield.

15. The data storage and retrieval apparatus of claim 14, wherein the read gap comprises a layer of alumina between about 200 Å and about 400 Å thick.

16. The data storage and retrieval apparatus of claim 13 wherein the extra gap has a thickness at least about 1400 Å.

17. The data storage and retrieval apparatus of claim 13 wherein the extra gap has a thickness in a range about 1400 Å to about 1700 Å.

* * * * *